US009311011B2

(12) United States Patent
Gathala et al.

(10) Patent No.: US 9,311,011 B2
(45) Date of Patent: Apr. 12, 2016

(54) DYNAMIC ADDRESS NEGOTIATION FOR SHARED MEMORY REGIONS IN HETEROGENOUS MULTIPROCESSOR SYSTEMS

(71) Applicant: QUALCOMM Incorporated, San Diego, CA (US)

(72) Inventors: Sudha Anil Kumar Gathala, Santa Clara, CA (US); Andrey Ermolinskiy, San Diego, CA (US); Christopher A. Vick, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 13/961,085

(22) Filed: Aug. 7, 2013

(65) Prior Publication Data

US 2015/0046661 A1  Feb. 12, 2015

(51) Int. Cl.
*G06F 3/06* (2006.01)
*G06F 9/54* (2006.01)

(52) U.S. Cl.
CPC ............ *G06F 3/0638* (2013.01); *G06F 3/0613* (2013.01); *G06F 3/0671* (2013.01); *G06F 9/544* (2013.01)

(58) Field of Classification Search
CPC ............ G06F 2221/2149; G06F 21/00; G06F 2221/2113; G06F 2221/2141; G06F 2221/034; G06F 9/45558; G06F 11/0712; G06F 9/4555; G06F 9/5077; G06F 2009/45583; G06F 9/5016; G06F 9/544; G06F 11/0727; G06F 2009/45579; G06F 9/545; G06F 12/1475; G06F 21/85; G06F 9/3004; G06F 12/1009; G06F 12/109; G06F 12/1483

USPC .......... 711/E12.001, E12.059, E12.068, 147, 711/153, 154, 167, 202; 709/215, 218, 230, 709/213, 1; 718/1, 100, 102, 108
See application file for complete search history.

(56) References Cited

U.S. PATENT DOCUMENTS 7,073,173 B1 * 7/2006 Willman ........................ 718/1
7,676,514 B2 * 3/2010 Faibish et al. ................ 707/646
(Continued)

FOREIGN PATENT DOCUMENTS

EP         2386087 A2      11/2011
WO      2012/134557 A1   10/2012

OTHER PUBLICATIONS

International Search Report and Written Opinion—PCT/US2014/049764—ISA/EPO—Oct. 27, 2014.

*Primary Examiner* — Sanjiv Shah
*Assistant Examiner* — Edward Waddy, Jr.
(74) *Attorney, Agent, or Firm* — The Marbury Law Group, PLLC

(57) ABSTRACT

Mobile computing devices may be configured to compile and execute portions of a general purpose software application in an auxiliary processor (e.g., a DSP) of a multiprocessor system by reading and writing information to a shared memory. A first process (P1) on the applications processor may request address negotiation with a second process (P2) on the auxiliary processor, obtain a first address map from a first operating system, and send the first address map to the auxiliary processor. The second process (P2) may receive the first address map, obtain a second address map from a second operating system, identify matching addresses in the first and second address maps, store the matching addresses as common virtual addresses, and send the common virtual addresses back to the applications processor. The first and second processes (i.e., P1 and P2) may each use the common virtual addresses to map physical pages to the memory.

14 Claims, 9 Drawing Sheets

(56) References Cited

U.S. PATENT DOCUMENTS

| | | |
|---|---|---|
| 7,975,260 B1 | 7/2011 | Conover |
| 8,255,922 B1 | 8/2012 | Fresko et al. |
| 2002/0062401 A1 | 5/2002 | Auslander et al. |
| 2007/0283103 A1* | 12/2007 | Hofstee et al. ............... 711/148 |
| 2008/0086620 A1* | 4/2008 | Morris ............... G06F 12/0284 711/203 |
| 2008/0114887 A1* | 5/2008 | Bryers et al. ............... 709/230 |
| 2009/0113424 A1 | 4/2009 | Chen et al. |
| 2009/0164749 A1* | 6/2009 | England ............... G06F 9/545 711/203 |
| 2010/0118041 A1 | 5/2010 | Chen et al. |
| 2011/0314238 A1* | 12/2011 | Finkler ............... G06F 9/544 711/162 |

* cited by examiner

DYNAMIC ADDRESS NEGOTIATION FOR SHARED MEMORY REGIONS IN HETEROGENOUS MULTIPROCESSOR SYSTEMS

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile electronic devices (e.g., cellular phones, watches, media players, etc.) have become more complex than ever, and now commonly include multiple processors, system-on-chips (SoCs), and other resources that allow mobile device users to execute complex and power intensive software applications (e.g., video streaming, video processing, etc.) on their mobile devices. With this rise in complexity and power consumption, new and improved memory management solutions that improve the computational and power management performance of mobile devices will be beneficial to consumers.

SUMMARY

The various aspects include methods of providing access to a shared memory region of a multiprocessor computing device having a first processing core and a second processing core including, requesting by a first process in the first processing core address negotiation with a second process in the second processing core, obtaining a first address map of the first process in the first processing core, sending the first address map to the second processing core, receiving a common virtual address in the first processing core in response to sending the first address map, storing the common virtual address as a first attribute of the shared memory region inside a first operating system kernel of the first processing core, and mapping the shared memory region at the common virtual address of the first process.

In an aspect, the method may include receiving the first address map in the second processing core, obtaining a second address map of the second process in the second processing core, performing address matching operations in the second processing core to determine whether the first and second address maps include a matching virtual address, storing the matching virtual address as the common virtual address and as a second attribute of the shared memory region of a second operating system kernel of the second processing core, sending the common virtual address to the first processing core, and mapping physical pages of the shared memory region at the common virtual address for the second process in the second processing core.

In a further aspect, each of the first and second processing cores may include a hardware memory management unit (MMU). In a further aspect, receiving the first address map in the second processing core may include receiving the first address map in an address negotiation handler thread of the second processing core.

Further aspects include a multiprocessor computing device that may include means for requesting by a first process in a first processing core address negotiation with a second process in a second processing core, means for obtaining a first address map of the first process in the first processing core, means for sending the first address map to the second processing core, means for receiving a common virtual address in the first processing core in response to sending the first address map, means for storing the common virtual address as a first attribute of a shared memory region inside a first operating system kernel of the first processing core, and means for mapping the shared memory region at the common virtual address of the first process.

In an aspect, the multiprocessor computing device may include means for receiving the first address map in the second processing core, means for obtaining a second address map of the second process in the second processing core, means for performing address matching operations in the second processing core to determine whether the first and second address maps include a matching virtual address, means for storing the matching virtual address as the common virtual address and as a second attribute of the shared memory region of a second operating system kernel of the second processing core, means for sending the common virtual address to the first processing core, and means for mapping physical pages of the shared memory region at the common virtual address for the second process in the second processing core.

In a further aspect, the multiprocessor computing device may include means for receiving the first address map in the second processing core may include means for receiving the first address map in an address negotiation handler thread of the second processing core.

Further aspects include a multiprocessor computing device having a first processing core, a second processing core, and a shared memory region coupled to the first and second processing cores, and in which the first processing core is be configured with processor-executable instructions to perform operations including requesting by a first process address negotiation with a second process in the second processing core, obtaining a first address map of the first process, sending the first address map to the second processing core, receiving a common virtual address in response to sending the first address map to the second processing core, storing the common virtual address as a first attribute of the shared memory region inside a first operating system kernel, and mapping the shared memory region at the common virtual address of the first process.

In an aspect, the second processing core may be configured with processor-executable instructions to perform operations including receiving the first address map, obtaining a second address map of the second process, performing address matching operations to determine whether the first and second address maps include a matching virtual address, storing the matching virtual address as the common virtual address and as a second attribute of the shared memory region of a second operating system kernel, sending the common virtual address to the first processing core, and mapping physical pages of the shared memory region at the common virtual address for the second process.

In an aspect, each of the first and second processing cores may include a hardware memory management unit (MMU). In a further aspect, the second processing core may be configured with processor-executable instructions to perform operations such that receiving the first address map may include receiving the first address map in an address negotiation handler thread.

Further aspects include a non-transitory computer readable storage medium having stored thereon processor-executable software instructions configured to cause a first processing core of a multiprocessor computing device to perform operations that including requesting by a first process address negotiation with a second process in the second processing core, obtaining a first address map of the first process, sending the first address map to the second processing core, receiving a common virtual address in response to sending the first address map to the second processing core, storing the common virtual address as a first attribute of the shared memory region inside a first operating system kernel, and mapping the shared memory region at the common virtual address of the first process.

In an aspect, the stored processor-executable software instructions may be configured to cause the second processing core of the multiprocessor computing device to perform operations including receiving the first address map, obtaining a second address map of the second process, performing address matching operations to determine whether the first and second address maps include a matching virtual address, storing the matching virtual address as the common virtual address and as a second attribute of the shared memory region of a second operating system kernel, sending the common virtual address to the first processing core, and mapping physical pages of the shared memory region at the common virtual address for the second process.

In a further aspect, the stored processor-executable software instructions may be configured to cause the second processing core of the multiprocessor computing device to perform operations such that receiving the first address map may include receiving the first address map in an address negotiation handler thread.

BRIEF DESCRIPTION OF THE DRAWINGS

The accompanying drawings, which are incorporated herein and constitute part of this specification, illustrate exemplary aspect of the invention, and together with the general description given above and the detailed description given below, serve to explain the features of the invention.

DETAILED DESCRIPTION

Figure 1:
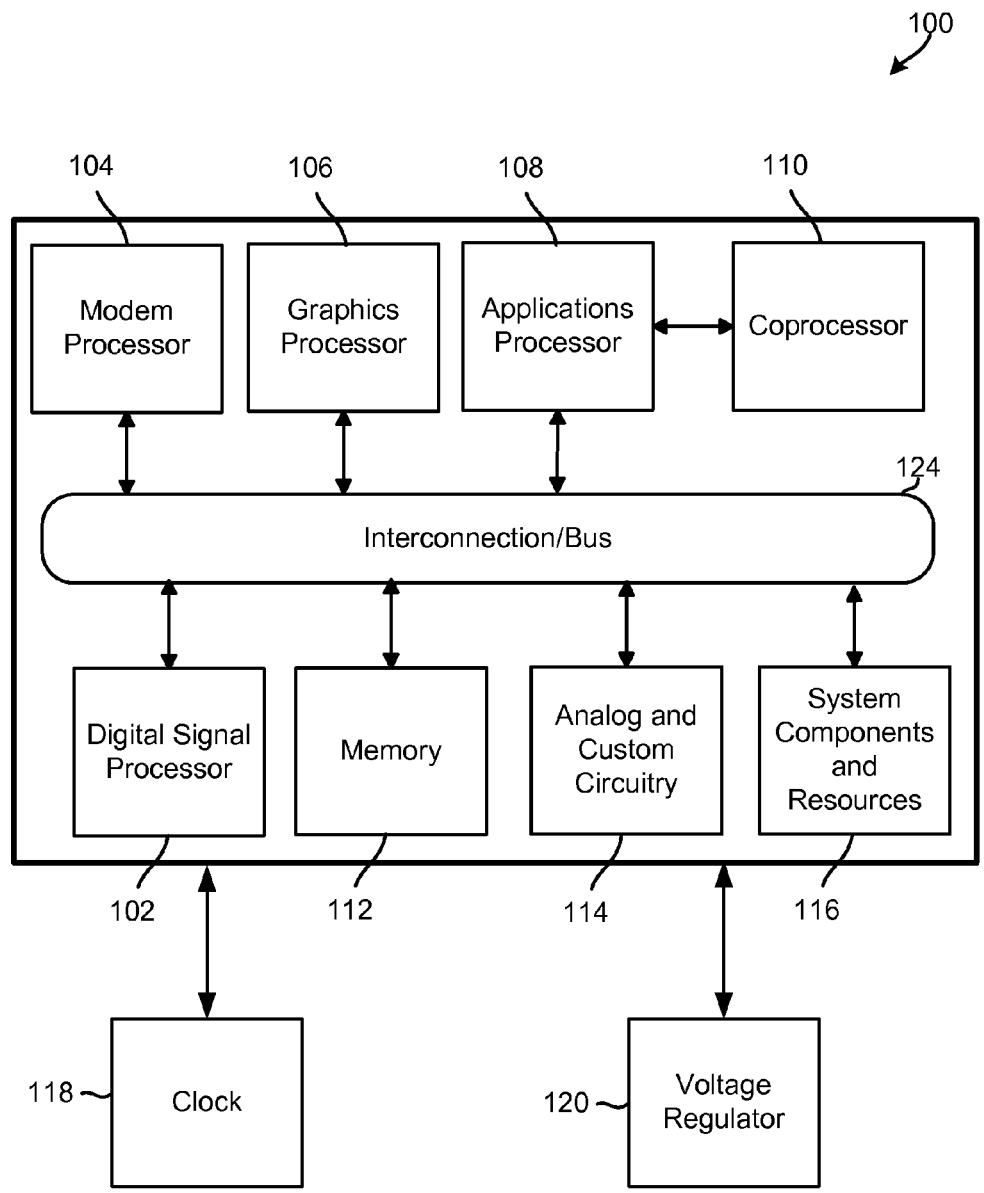
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include methods, as well as processors configured to perform the methods, of providing access to a memory that is shared between a general purpose applications processor and an auxiliary processor (e.g., a DSP) in a system-on-a-chip (SOC). Access to the shared memory may be provided by configuring the processors so that a first process (P1) on the applications processor requests address negotiation with a second process (P2) on the auxiliary processor (e.g., via a system call to the operating system kernel), obtains a first address map from a first operating system, and sends the first address map to the auxiliary processor. The second process (P2) may receive the first address map, obtain a second address map from a second operating system, invoke an address matching algorithm or routine to identify matching/overlapping addresses in the first and second address maps, store the matching/overlapping addresses as common virtual addresses, and send the common virtual addresses to the applications processor (e.g., via a system call, remote method invocation, etc.). The first and second processes (i.e., P1 and P2) may each use the common virtual addresses to map physical pages to the memory. By sharing the address maps and common virtual addresses, the various aspects allow the two heterogeneous processors to communicate more efficiently.

The terms "computing system" and "computing device" are used generically herein to refer to any one or all of servers, personal computers, and mobile devices, such as cellular telephones, smartphones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar personal electronic devices which include a programmable processor. While the various aspects are particularly useful in mobile devices, such as smartphones, which have limited processing power and battery life, the aspects are generally useful in any computing device that includes a programmable processor and an auxiliary processor.

The term "monitor agent" is used generically herein to refer to any hardware component or software that supports virtualization technology and/or enables the abstraction (or virtualization) of computing resources, including any one or all of hardware monitors, specialized hardware fabricated on the chip, hypervisors, virtual machine monitors, monitor software running outside of a high level operation system (HLOS), and software monitors running as part of device drivers, which may be outside the HLOS, its memory management systems, and/or its allocator functions.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

In recent years, mobile computing device architectures have grown in complexity, and now commonly include multiple processor cores, SOCs, coprocessors, functional modules that include dedicated processors (e.g., communication modem chips, GPS receivers, etc.), complex memory systems, intricate electrical interconnections (e.g., buses and/or fabrics), and numerous other resources that suitable for executing complex and power intensive software applications (e.g., video streaming applications, etc.). With this rise in complexity, new processing and memory management solutions are required to improve the performance and power consumption characteristics of mobile devices.

To improve performance and maximize battery life, a mobile device applications processor may be configured to offload operations to auxiliary processor, thereby enabling improvements in processing and/or power efficiencies. The operations of offloading operations to an auxiliary processor may include converting or translating portions of a software application into code that is suitable for execution on the auxiliary processor of the device, executing different portions of that software application in different heterogeneous processors at the same time, and communicating the results of the execution back to the applications processor. For example, the mobile device may be configured to analyze the software application's object code, identify the operations that are required to be performed during execution of the object code, partition the object code into object code segments based on identified operations, determine whether an object code segment can be processed in an auxiliary processor, translate one or more object code segments into a format that is suitable for execution in the auxiliary processor, and cause the auxiliary processor to execute the translated object code segments in parallel with the non-translated object code segments executed on the applications processor.

By executing some of the code portions in an auxiliary processor, significant gains in performance, efficiency, and/or power consumption (herein "performance characteristics") may be realized when compared to simply executing the entire software application in the main applications processor or CPU of the mobile device. However, existing memory management systems may limit the effectiveness of using such solutions in mobile devices.

Due to the complexity of modern mobile computing device architectures, the performance characteristics of a mobile device depend largely on the speed, width, and bandwidth of the device's communication buses. Yet, existing memory management systems may require extensive use of system buses to read and write data to and from memory when offloading code portions to the auxiliary processor and sending execution results to the applications processor. Such extensive use of the device's communication buses may reduce or offset any gains in performance, efficiency, or power consumption that are achieved by the offloading operations.

The various aspects provide improved memory management solutions that provide access to a memory region that is shared between two or more heterogeneous processors (e.g., an applications processor and an auxiliary processor) in a multiprocessor system. By allowing heterogeneous processors to read and write to the same memory regions, and providing access to and use of such shared memory regions, the various aspects reduce the amount of information that is communicated via system buses and/or fabrics when offloading and executing portions of a software application in an auxiliary processor of the mobile device.

Generally, each heterogeneous processor in a multiprocessor system includes an operating system that performs memory management operations independent of the other operating systems and processors in the system. For example, the multiprocessor system may include a first processor that executes a first type of operating system (e.g., FreeBSD, LINUX, OS X, etc.) and a second processor that executes a second type of operating system (e.g., Microsoft Windows 8). Each of these operating systems may include a memory management system for managing the allocation and use of system memory by application programs executing on its processor. For example, each operating system may include a virtual memory manager (OS VMM) configured to allocate virtual memory addresses to the application programs and ensure that memory used by one process does not interfere with memory already in use by another process. When a process requires access to the physical memory, these virtual addresses are translated to physical memory addresses by a memory management unit (MMU) that is specific to the processor.

Thus, in existing systems, each processor performs memory management operations using an independent operating system and separate MMU, and there is no executive control between the processors for coordinating the allocation or use of the memory addresses. However, a multiprocessor system may include memory regions that are accessible to two or more of its heterogeneous processors. Therefore, it would be advantageous if the two or more processors could communicate via references to this shared memory when performing offloading operations. For example, the amount of information that is communicated via the system buses/fabrics when offloading portions of a software application to an auxiliary processor would be reduced if the processors were to communicate via references to shared memory. Yet existing memory management solutions require that each processor perform memory addressing operations independent of the other processors in the system, and as a result, the processors cannot communicate pointers, relative addresses, virtual addresses or via references to the shared memory.

For example, accessing a shared memory region using existing memory management solutions may require a first process (P1) in a first processor to create a shared memory region, notify a second process (P2) in a second processor of the existence of the shared memory, issue a request to a first operating system kernel in the first processor to map the shared memory region into its address space, and receive a virtual address (VA1) assignment for that shared memory region (i.e., the first operations system may assign virtual address VA1 to the first process). The second process (P2) may receive the notification of the existence of the shared memory region, issue a request to a second operating system kernel in the second processor to map the shared memory region, and receive a different virtual address (VA2) assignment for that same shared memory region.

Since in conventional systems each operating system assigns the virtual addresses independently and there is no executive control between the processors for coordinating the allocation or use of these memory addresses, the virtual address (VA1) assigned by the first processor for a shared memory location will not be the same as the virtual address (VA2) assigned by the second processor for the same shared memory location. Because these virtual addresses are different, the two processors cannot directly communicate pointers, relative addresses, virtual addresses or via references to the shared memory.

As an example, consider a situation in which the first process (P1) running in the first processor creates a linked list (e.g., list [data, next]) in the shared memory region so that the "next" field of the link list includes the virtual addresses of the subsequent nodes/addresses. If P1 were to attempt to share the linked list with a second process (P2) running in the second processing core by passing the virtual address of the head of the list to P2 using existing solutions, P2 would have to recalculate all the "next" pointers because it has a different virtual address (i.e., VA2) for the shared memory region. Recalculating these points is an inefficient use of resources that negatively impacts the performance and power consumption characteristics of the multiprocessor system.

The various aspects overcome these limitations in conventional systems by configuring multiprocessor systems to assign memory addresses so that the same virtual address can be used in two different heterogeneous processors to reference the same physical addresses. By assigning the same virtual address in different processors, the various aspects allow the processors to avoid performing address translation operations and more directly communicate pointers, relative addresses, virtual addresses or via references to the shared memory. The various aspects reduce the number of operations that are performed when offloading portions of a general purpose software application to an auxiliary processor, thereby improving the performance characteristics of the mobile device. The various aspects also reduce the amount of information that is communicated via system buses and fabrics, further improving the performance characteristics of the device.

In an aspect, a first processing core of a mobile device may be configured to create a shared memory region, generate a map of the shared memory region, and send the map to a second processing core of the mobile device. The second processing core may be configured to receive the map, compare the received map to address ranges in its virtual memory area (VMA) or its own map of the shared memory region, identify intersections between the two maps/addresses (e.g., range of virtual address that are unused on both sides), and communicate the identified intersections back to the first processing core. Both the first and second processing cores may use common virtual addresses included in the identified intersections to reference physical addresses in the shared memory region. This allows the first and second processes (i.e., P1 and P2) on the first and second processors to communicate pointers, relative addresses, virtual addresses, memory references, etc.

The various aspects may be implemented on a number of multiprocessor computer systems, including a system-on-chip (SOC) such as illustrated in FIG. 1. The SOC 100 may include a number of heterogeneous processing cores, such as a digital signal processor (DSP) 102, a modem processor 104, a graphics processor 106, and an applications processor 108. The SOC 100 may also include one or more coprocessors 110 (e.g., vector co-processor, etc.) connected to one or more of the heterogeneous processors 102, 104, 106, 108. Each processor 102, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft® Windows 8).

The processors 102, 104, 106, 108, 110 may be independent processing cores that are in close proximity (e.g., on a single substrate, die, integrated chip, etc.) to one another. The proximity of the processors 102, 104, 106, 108, 110 allows memory 112 to operate at a much higher frequency/clock-rate than is possible if data signals have to travel off-chip. Moreover, the proximity of the processors 102, 104, 106, 108, 110 allows for the sharing of on-chip memory and resources (e.g., voltage rail), as well as for more coordinated cooperation between cores.

The processors 102, 104, 106, 108 may be interconnected to each other and one or more memory elements 112, system resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The applications processor 108 may be a central processing unit (CPU), a component of a CPU, or a processing unit coupled to a CPU. In an aspect, the CPU may be configured to read and write information to and from the various memories of the processors 102-110, system components, resources, or peripherals. In an aspect, the processors may read and write to the memories via the memory management system controllers of the respective processors 102-110, resources, and/or peripherals.

The system-on-chip (SOC) 100 may include coprocessors 110 connected to one or more of the processors 102-108. Such coprocessors 110 may be particularly useful for processing applications that require fast and parallel execution, such as multimedia and video streaming applications. In an aspect, the coprocessors 110 may implement a single instruction multiple data (SIMD) instruction set architecture (ISA) that includes independent hardware registers, memory, and/or execution hardware. In an aspect, a SIMD vector co-processor may be a part of, or closely coupled to, the applications processor 108.

The SOC 100 may also include analog circuitry and custom circuitry 114 for managing sensor data, analog-to-digital conversions, wireless data transmissions, and for performing other specialized operations, such as processing encoded audio and video signals for rendering on an electronic display and speaker of a mobile device.

The SOC 100 may further include system components and resources 116, such as voltage regulators, oscillators, phase-locked loops, peripheral bridges, data controllers, memory controllers, system controllers, access ports, timers, and other similar components used to support the processors and software clients (e.g., a web browser, etc.) running on a computing device. The system components/resources 116 and custom circuitry 114 may also include circuitry to interface with peripheral devices, such as cameras, electronic displays, wireless communication devices, external memory chips, etc.

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., a DSP 102, a modem processor 104, a graphics processor 106, an applications processor 108, etc.).

Figure 2:
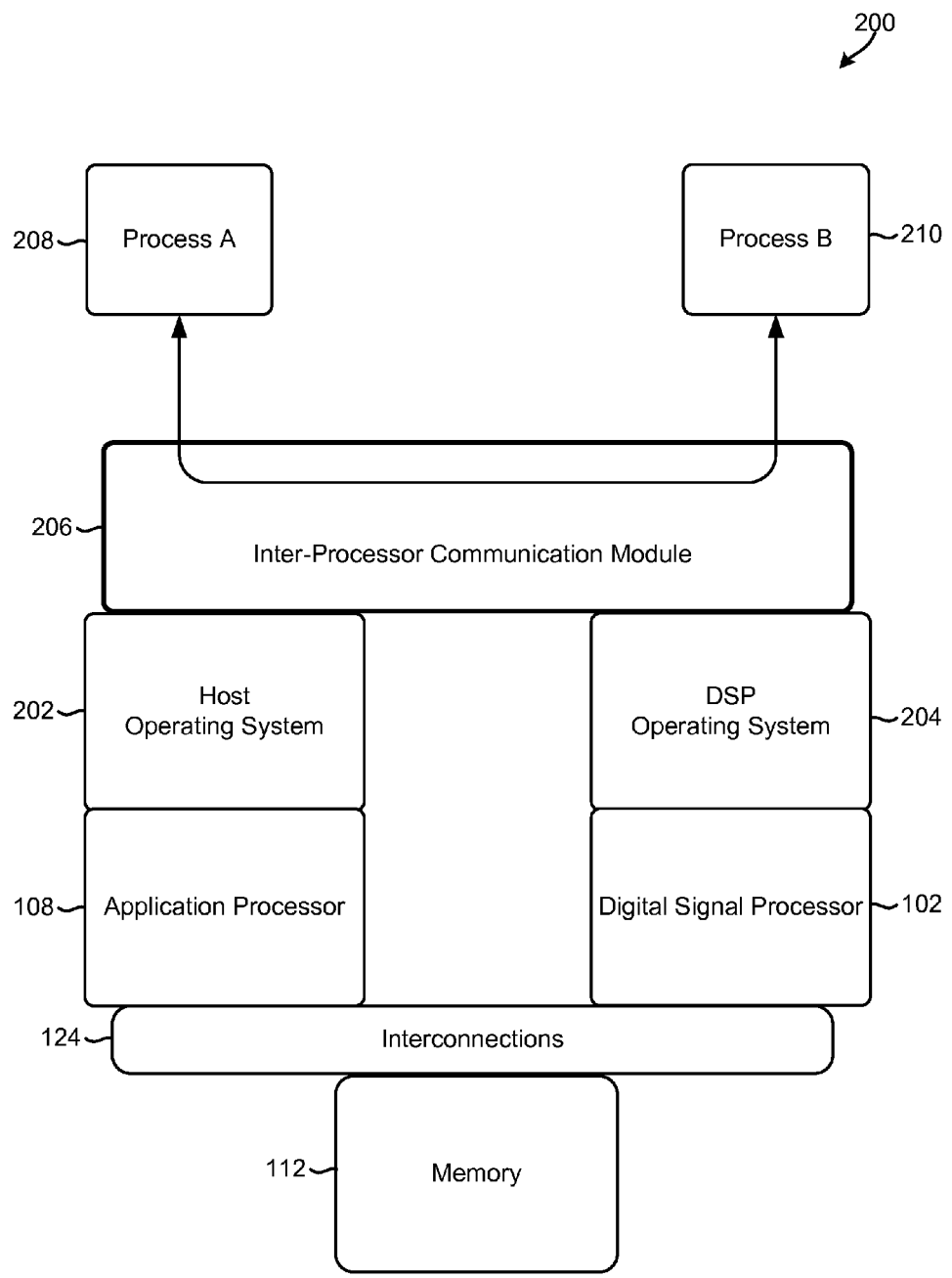
FIG. 2 is a block diagram illustrating example logical and functional components in an aspect multiprocessor computing system that includes two processors configured to communicate address maps and common virtual addresses.

FIG. 2 illustrates example logical and functional components in an aspect multiprocessor computing system 200 that includes processors configured to communicate address maps and common virtual addresses. The illustrated computer system 200 includes both hardware components and software components. The hardware components may include an applications processor 108, a digital signal processor (DSP) 102, an interconnections module 124, and a shared memory 112 module. The software components may include a host operating system 202, a DSP operating system 204, an inter-processor communication module 206, a host operating system user process (Process A) 208, and a DSP process (Process B) 210. In various aspects, the inter-processor communication module 206 may be included as part of a virtual machine, host operating system 202, a guest operating system, a high level operating system (HLOS), a monitor agent, a hypervisor, etc. The DSP process 210 may be a subroutine, procedure, process, thread, or service configured to cause the digital signal processor 102 perform one or more operations. The host operating system user process 208 may be a process of a general purpose software application program.

Generally, processes that share, have access to, and/or operate within one processing core may communicate via fast memory read/write operations. On the other hand, communications between independent processes in different processing cores are typically accomplished via relatively slow function calls, method invocations, procedure calls, message exchanges, domain sockets (e.g., Unix-domain sockets), and other forms of inter-process communication (IPC). Remote procedure calls (RPC) and remote method invocations (RMI) are inter-process communications that allow a calling process to cause a subroutine, procedure, process, thread, or service (herein collectively "service") to execute in another address space, commonly on another processor, chip, or computing device.

In multiprocessor systems, the memory and resources available to different processors (e.g., processors 108, 102) are often in separate domains (e.g., protection domains, physical domains, etc.). In addition, the processors are typically configured with different operating systems and/or implement different hardware description languages (HDL) or instruction set architectures (ISA). In such systems, RPC/RMI mechanisms may provide a well-defined interface that allows a calling process on a first processor to cause a service to execute in a second processor, and for the second processor to send the results of the execution of the service back to the first processor.

Referring to FIG. 2, the host operating system user process 208 may invoke the DSP process 210 and cause it to begin performing general application program operations on the DSP 102. After completing the operations, the DSP service 210 may communicate the results of those operations to the host operating system user process 208. In the various embodiments, such inter-processor communications may be accomplished via the inter-processor communication module 206, which may be configured to perform, manage, or facilitate the communications between the processors 108, 102 via any of the IPC mechanisms discussed above or via direct memory read/write operations.

Figure 3:
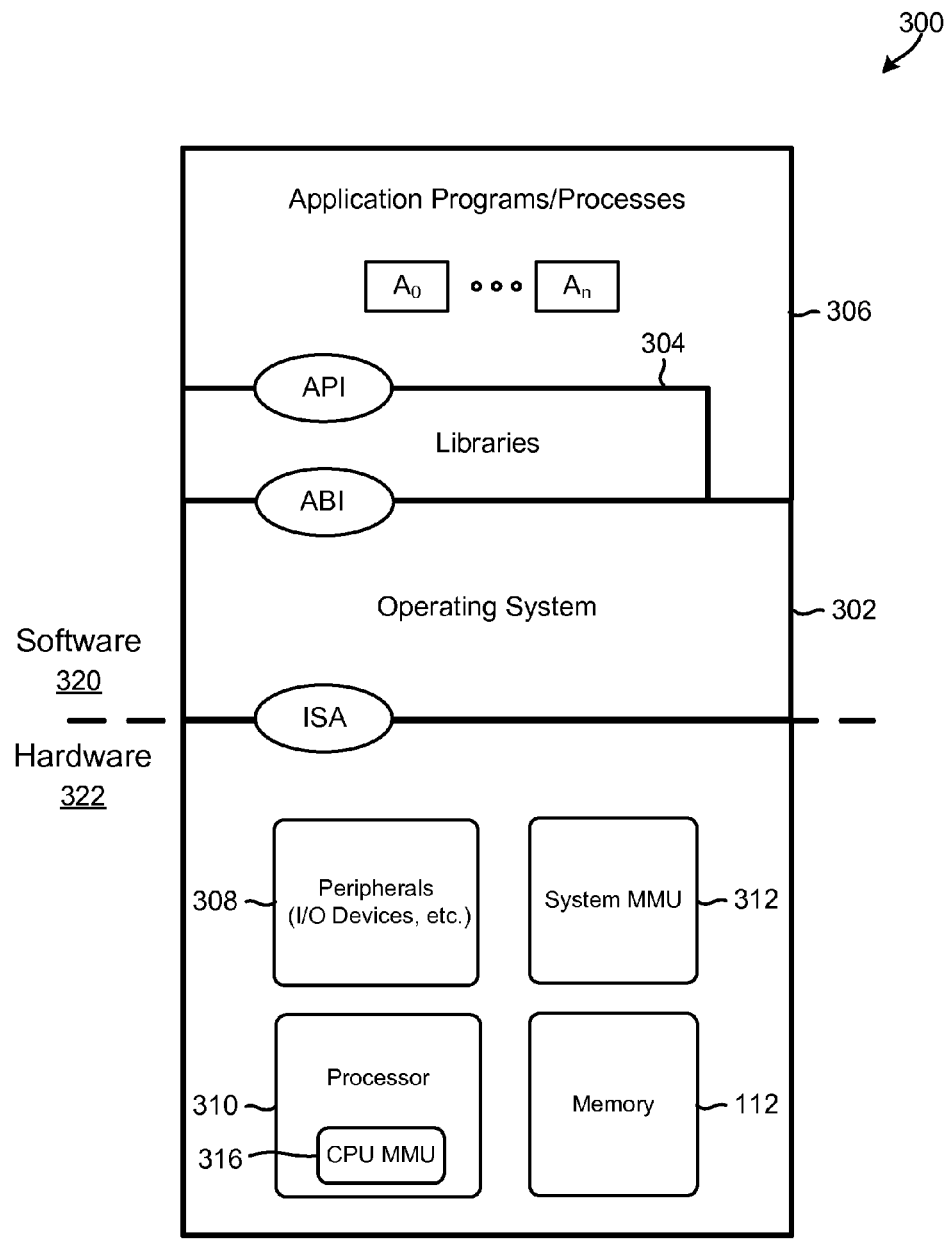
FIG. 3 is a block diagram illustrating logical components and interfaces of an example processing core that may be configured to implement a memory management solution in accordance with the various aspects.

FIG. 3 illustrates logical components and interfaces of an example processing core (e.g., applications processor 108, etc.) that may be configured to implement a memory management solution in accordance with the various aspects. The illustrated computer system architecture 300 includes both hardware components 322 and software components 320. The software components 320 may include an operating system 302, a library module 304, and one or more application programs ($A_0$ through $A_n$) 306. The hardware components 322 may include peripherals 308 (e.g., hardware accelerators, input/output devices, etc.), a central processing unit (CPU) 310, a central processing unit memory management unit (CPU MMU) 316, one or more system memory management units (herein "system MMU" or "SMMU") 312, and one or more memories 314.

Generally, application software written for mobile computing devices may be compiled into executable code, which is what is commonly referred to as "applications," "apps," or application programs 306. Each application program 306 may be a single process or thread, or may include a plurality of processes or threads. The application programs 306 may issue high-level language (HLL) library calls to the library module 304 via an application program interface (API). The library module 304 may invoke services (e.g., via operating system calls) on the operating system 302 via an application binary interface (ABI). The operating system 302 may communicate with the hardware components using a specific instruction set architecture (ISA), which is a listing of specific operation codes (opcode) and native commands implemented by the hardware 322. In this manner, the instruction set architecture may define the hardware 322 as seen by the operating system 302.

The operating system 302 may be configured to coordinate and control the allocation and use of the various memories 314 amongst the application programs 306, which may include partitioning the physical memory across the multiple application programs (A0-An) 306. In an aspect, this may be achieved via a memory address space translation process in which the operating system 302 assigns virtual addresses (VAs) to each application programs ($A_0$-$A_n$) 306, and then allocates the physical memory addresses (PAs) based on the virtual addresses (VAs) before the application programs ($A_0$-$A_n$) 306 execution.

The operating system 302 may include one or more memory management systems (e.g., a virtual memory manager, etc.) for managing the allocation and use of system memory by the various application programs ($A_0$ through $A_n$) 306. These memory management systems may function to ensure that the memory used by one process does not interfere with memory already in use by another process. For example, the operating system 302 may include a software-based memory manager configured to perform virtual addressing operations that enable the operating system 302 to make a particular physical address appear to be another address (i.e., a virtual address). These virtual addressing operations may include allocating virtual memory addresses to the application programs ($A_0$-$A_n$) 306.

In addition to the software-based memory management systems discussed above, the system may include one or more hardware-based memory management systems, such as the illustrated central processing unit (CPU) memory management unit (MMU) 316 and the system MMU 312. The CPU MMU 316 and the system MMU 312 may each include one or more hardware components responsible for performing various memory related operations, such as the translation of virtual addresses to physical addresses, cache control, bus arbitration, and memory protection.

In an aspect, the CPU MMU 316 may be responsible for providing address translation services and protection functionalities to the main CPU 310, and the system MMU 312 may be responsible for providing address translation services and protection functionalities to other hardware components (e.g., a digital signal processor, a modem processor, a graphics processor, etc.). In an embodiment, each of the processors in the multiprocessor system may include an independent MMU.

The memory management systems (e.g., CPU MMU 316, etc.) may include a translation look-aside buffer (TLB), which is a cache memory that may be used for memory address translations (e.g., translating virtual addresses to physical addresses, etc.). In an aspect, the translation look-aside buffer (TLB) may be a content-addressable memory (CAM), which may be a hardware associative array memory in which stored information is organized into key-value format (e.g., hash table). The keys may be virtual addresses and the values may be physical addresses. In various aspects, the translation look-aside buffer may be hardware-managed, software managed, or managed by a combination of hardware and software.

As part of a memory address translation process, a memory management system (e.g., OS VMM, system MMU 312, CPU MMU 316, etc.) may perform a content-addressable memory search to request a physical address from the translation look-aside buffer by sending the translation look-aside buffer a virtual address as the key. If a virtual address key has a corresponding physical address value in the translation look-aside buffer (i.e., a "TLB hit" occurs), the content-addressable memory search may retrieve and return the corresponding physical address. If the requested address is not in the translation look-aside buffer (i.e., a "TLB miss" occurs), the memory address translation process may perform a page walk (e.g., a software page walk, hardware page walk, etc.) by reading the contents of multiple memory locations and computing the physical address. After the physical address is determined by the page walk, a virtual address to physical address mapping may be stored in the translation look-aside buffer.

In aspects that include a software-managed translation look-aside buffer, a TLB miss may cause the operating system to walk the page tables and perform the translation in software. In aspects that include a hardware-managed translation look-aside buffer, the memory management system may perform a hardware table walk to determine if a valid page table entry exists for a specified virtual address key.

Figure 4:
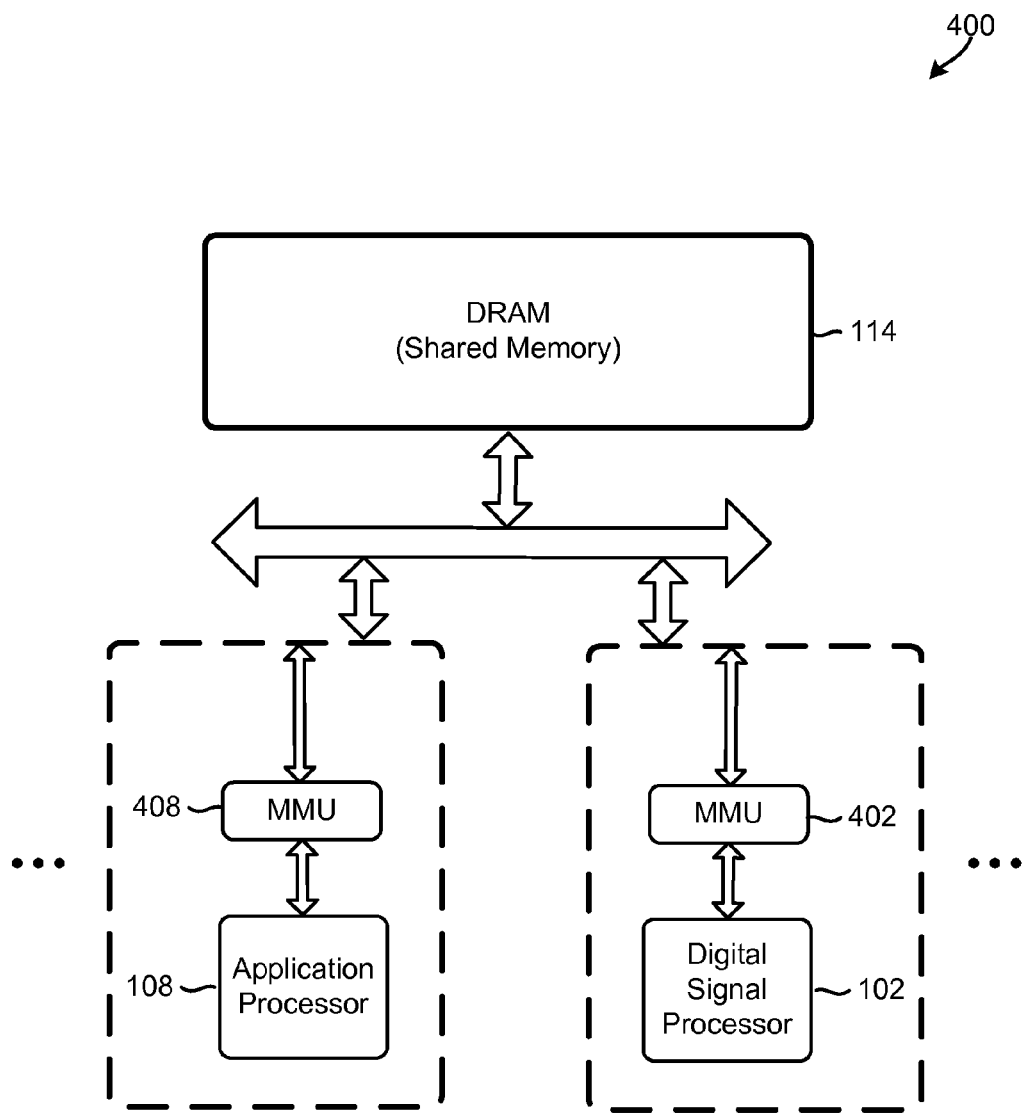
FIG. 4 is a block diagram illustrating an aspect multiprocessor computing system having a shared memory and a plurality of heterogeneous processors that include independent operating systems and separate memory management units (MMUs).

FIG. 4 illustrates an aspect multiprocessor computing system 400 having a shared memory 112 and a plurality of heterogeneous processors 102, 108, each of which include an independent operating system and a separate memory management unit (MMU) 402, 408.

Using existing memory management solutions, accessing the shared memory region may require that a first process (P1) in the applications processor 108 to create a shared memory region, notify (e.g., via system calls or IPC) a second process (P2) in the DSP 102 of the existence of the shared memory region, issue a request to a operating system kernel of the applications processor to map the shared memory region into its address space, and receive a virtual address (VA1) assignment for shared memory region. The second process (P2) may receive the notification from the first process (P1), issue a request to the DSP operating system kernel to map the shared memory region, and receive a different virtual address (VA2) assignment for that same shared memory region.

As discussed above, since each operating system assigns the virtual addresses independently and there is no executive control between the processors for coordinating the allocation or use of these memory addresses, the virtual address (VA1) assigned by the first processor for a shared memory location will not be the same as the virtual address (VA2) assigned by the second processor for that same shared memory location. As such, the two processors cannot directly communicate pointers, relative addresses, virtual addresses or via references to the shared memory different virtual addresses were assigned in the different processors.

In various aspects, the multiprocessor computing system 400 may be configured to assign memory addresses so that the same virtual address may be used by both heterogeneous processors 102, 108 to reference the same physical addresses in the shared memory 114. By assigning the same virtual address in different processors, the various aspects allow the processors to communicate pointers, relative addresses, virtual addresses or via references to the shared memory. The various aspects also reduce the number of operations that are performed when offloading portions of a general purpose software application to an auxiliary processor, thereby improving the performance characteristics of the system 400. The various aspects also reduce the amount of information that is communicated via system buses and fabrics, further improving the performance characteristics of the device.

Generally, an operating system keeps track of process address space as a list of address ranges called a virtual memory area. A task structure inside of the operating system kernel maintains a list of virtual memory areas (VMAs) that identify the ranges of virtual addresses used by a process.

In various aspects, the multiprocessor computing system 400 may be configured so that when the first process (P1) running in the applications processor 108 creates the shared memory region, it maps the memory region and sends the map to the DSP 102. The second process (P2) running in the DSP 102 then compares the received address map to its address ranges or its own map of the shared memory region, identifies intersections between the two maps/addresses (e.g., range of virtual address that are unused on both sides), and communicates the identified intersections back to the applications processor 108. Then, both processors 102, 108 map the shared memory region to a common virtual address identified in the intersection.

Figure 5A:
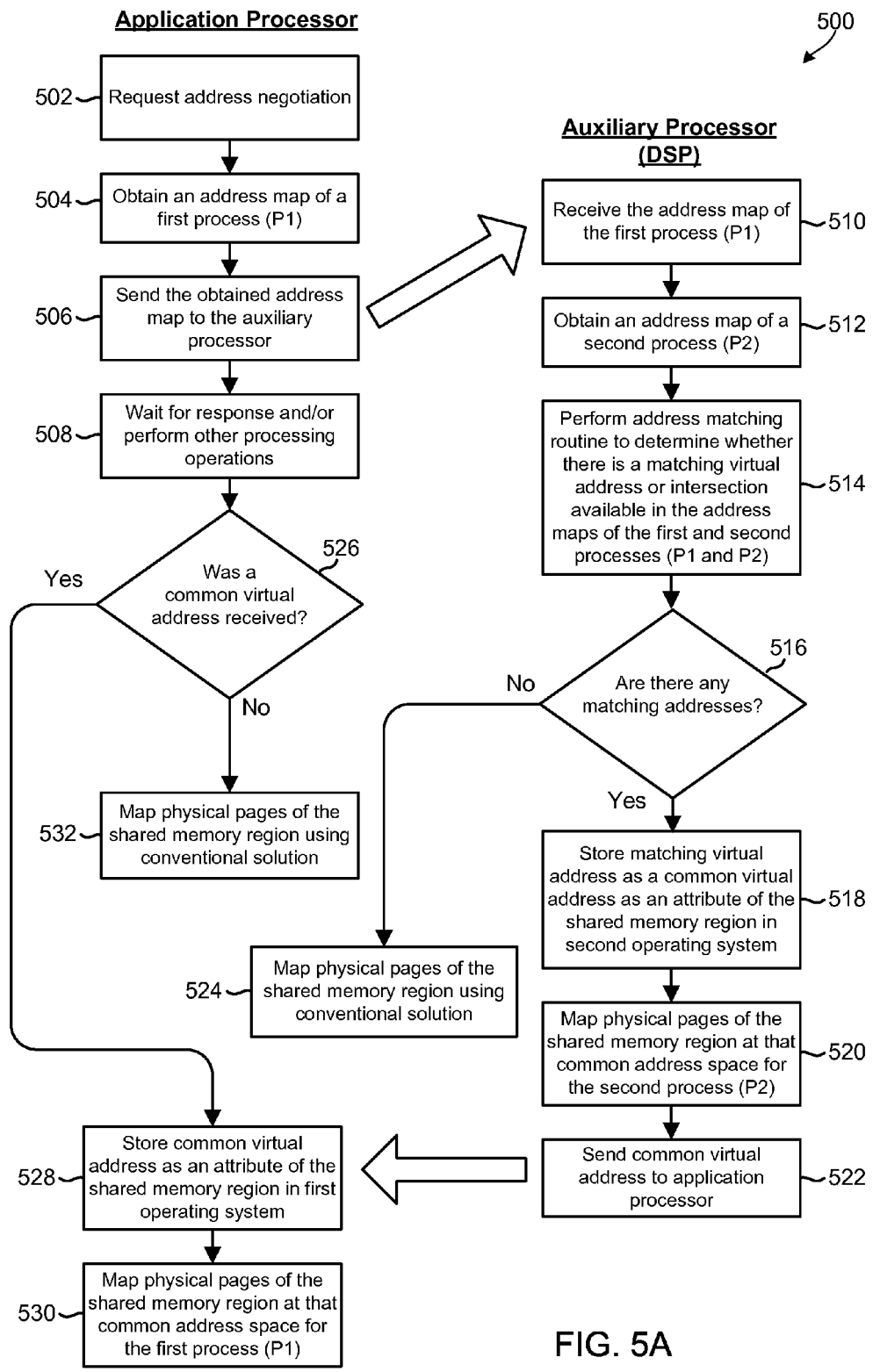
FIG. 5A is a process flow diagram illustrating an aspect method of providing access to a memory region that is shared between a general purpose applications processor and an auxiliary processor of a multiprocessor computing device.

FIG. 5A illustrates an aspect method 500 of providing access to a memory region that is shared between a general purpose applications processor and an auxiliary processor (e.g., a DSP) in a multiprocessor computing device. The aspect method 500 may be performed in a mobile computing device by an applications processor having a first operating system (OS) kernel and an auxiliary processor having a second OS kernel. In block 502, the applications processor may request (e.g., via a system call to the first OS kernel) address negotiation with the auxiliary processor. This may be accomplished by a first process (P1) in the applications processor issuing a system call to the first OS kernel requesting address negotiation with a second process (P2) in a second processing core.

In block 504, the applications processor may receive/obtain an address map of the first process (P1) in response to requesting address negotiation. In an aspect, the address map of the first process (P1) may be received in the auxiliary processor by an address negotiation handler thread in the auxiliary processor. In block 506, the applications processor may send the obtained address map to the second processing core. In block 508, the applications processor may wait for a response from the auxiliary processor and/or perform other processing tasks.

In block 510, the auxiliary processor may receive the address map of the first process (P1) from the applications processor. In block 512, the auxiliary processor may request and obtain an address map of the second process (P2), such as by issuing a system call to the second OS kernel. In block 514, the auxiliary processor may execute/perform an address matching routine/procedure to determine whether the address maps of the first and second processes (P1 and P2) include any matching virtual addresses or intersections. This may be accomplished by sorting and comparing the addresses or via any known address matching algorithm known in the art.

In determination block 516, the auxiliary processor may determine whether the address matching routine identified any matching addresses or intersections. When the auxiliary processor determines that the address maps of the first and second processes (P1 and P2) do not include any matching addresses or intersections (i.e., determination block 516="No"), in block 524, the auxiliary processor may map the physical pages of the shared memory region for the second process (P2) using conventional solutions.

When the auxiliary processor determines that the address maps of the first and second processes (P1 and P2) include matching addresses or intersections (i.e., determination block 516="Yes"), the auxiliary processor may store the matching virtual addresses as a common virtual addresses by storing them as an attribute of the shared memory region in the second OS kernel in block 518. That is, the logical address space of each process may include mapped regions of memory, and each mapped memory region may include various attributes, such as for controlling write-protection and determining whether the memory sharable. The auxiliary processor may store the matching virtual addresses as one of these attributes of the shared memory region in block 518. In block 520, the auxiliary processor may map the physical pages of the shared memory region at the common addresses for the second process (P2). In block 522, the auxiliary processor may send the common virtual addresses to the applications processor.

In determination block 516, the applications processor may poll a communication port or socket to determine whether a common virtual address was received from the auxiliary processor. When the applications processor determines that no common virtual address was received and that a sufficient amount of time has passed (i.e., determination block 526="No"), in block 532, the applications processor may map the physical pages of the shared memory region for the first process (P1) using conventional solutions.

When the applications processor determines that a common virtual address was received (i.e., determination block 526="Yes"), the applications processor may store the common virtual address as an attribute of the shared memory region inside the first OS kernel in block 528. In block 530, the applications processor may map the physical pages of the shared memory region at the common addresses for the first process (P1).

Figure 5B:
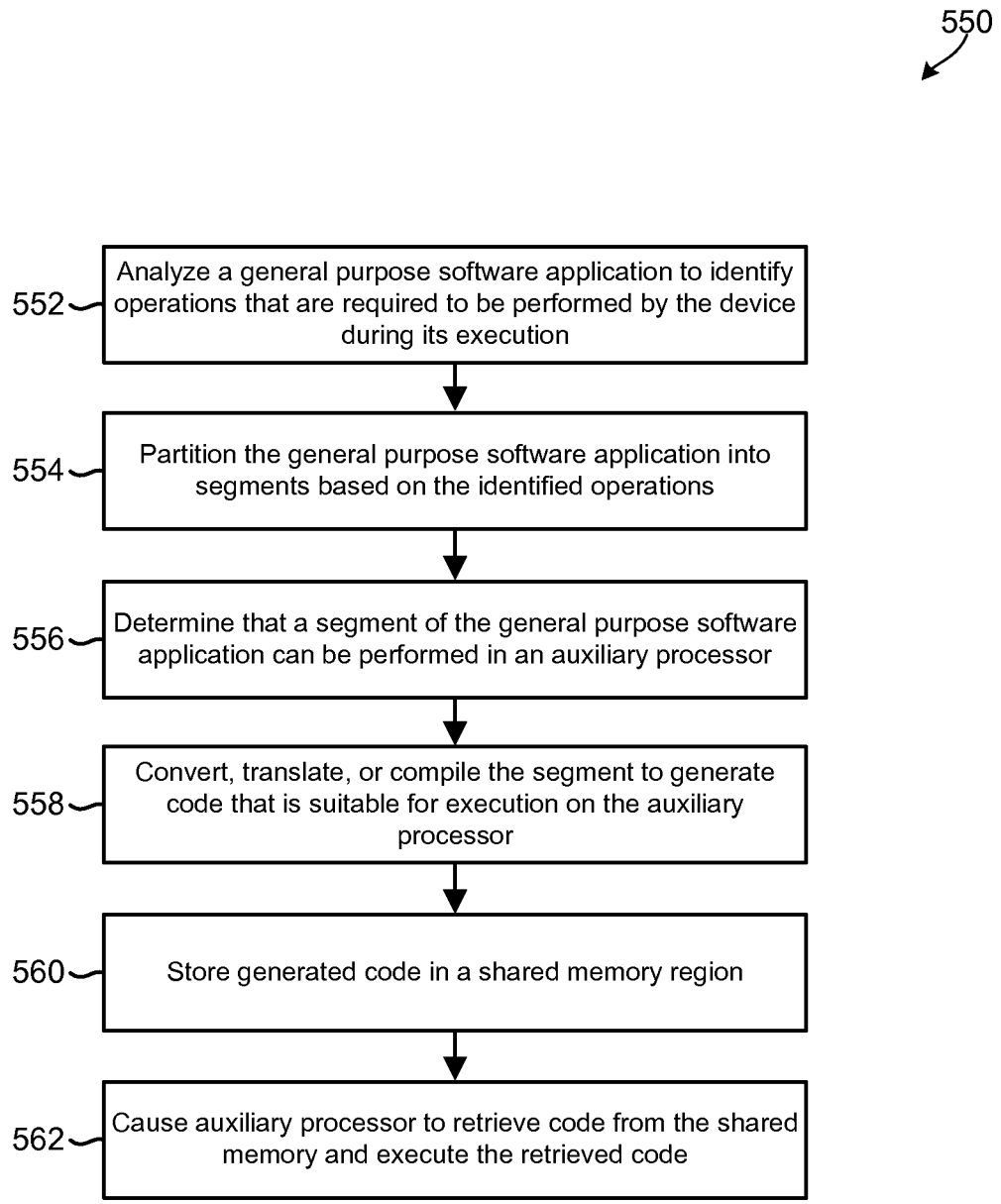
FIG. 5B is a process flow diagram illustrating an aspect method of offloading portions of a general purpose software application from an applications processor to an auxiliary processor of a multiprocessor computing device.

FIG. 5B illustrates an aspect method 550 of offloading portions of a general purpose software application to an auxiliary processor (e.g., a DSP). The operations of method 550 may be performed by an applications processor in a multi-processor computing device.

In block 552, the applications processor may analyze a general purpose software application to identify the operations that are required to be performed in the mobile device during its execution in the applications processor. In block 554, the applications processor may partition the software application into segments based on the identified operations. In block 556, the applications processor may determine that a segment of the general purpose software application can be performed in the auxiliary processor. In block 558, the applications processor may convert, translate, or compile the segment into code that is suitable for execution in the auxiliary processor. In block 560, the applications processor may store the generated code in a shared memory region that is accessible to both the applications processor and the auxiliary processor. In block 562, the applications processor may cause the auxiliary processor to retrieve the code from the shared memory region and execute the code. In an aspect, this may be accomplished by the applications processor communicating a memory reference to the auxiliary processor, such as by sending the auxiliary processor a virtual memory address or a header of a linked list.

Figure 6:
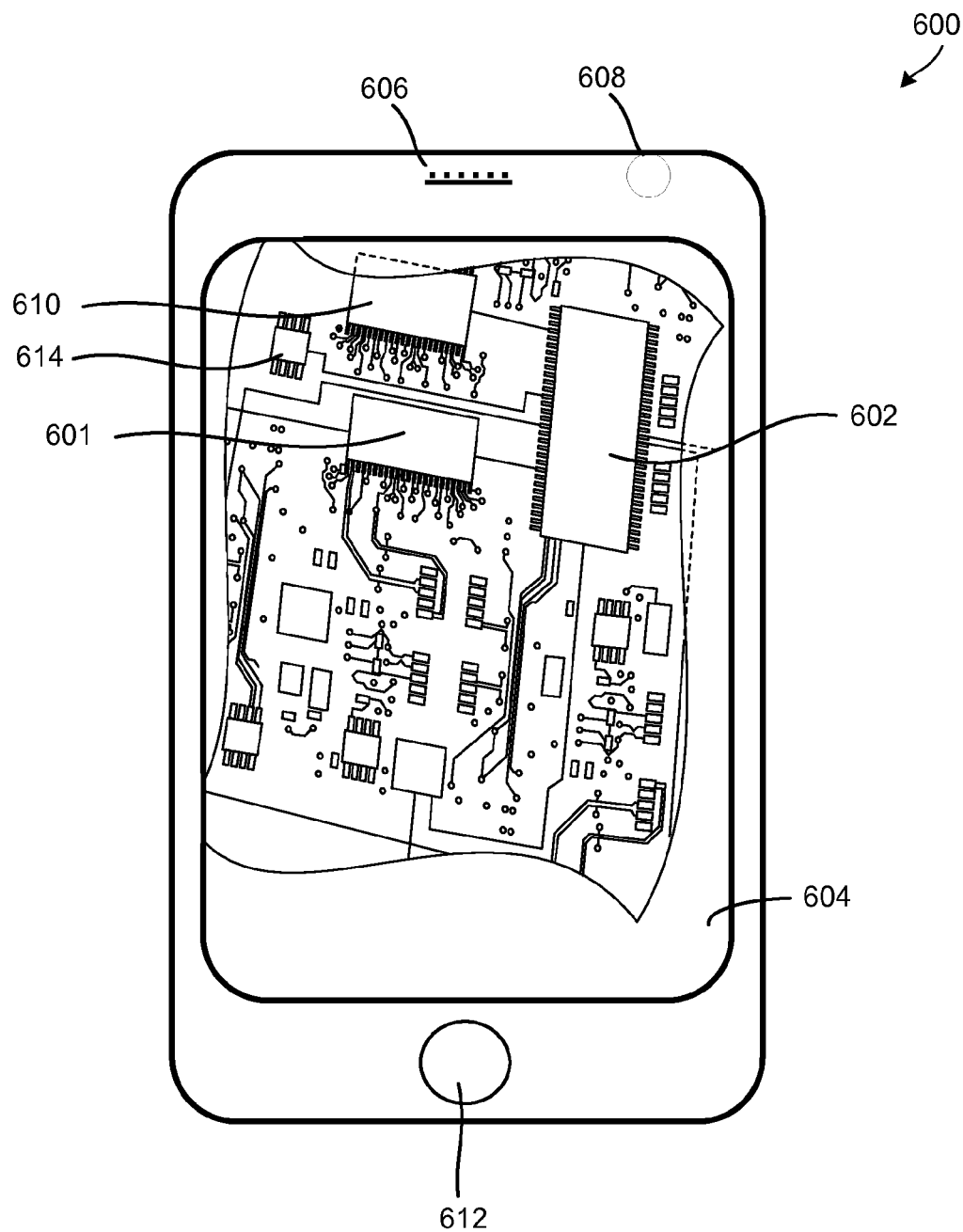
FIG. 6 is a component block diagram of an example mobile computing device suitable for use with the various aspects.
Figure 7:
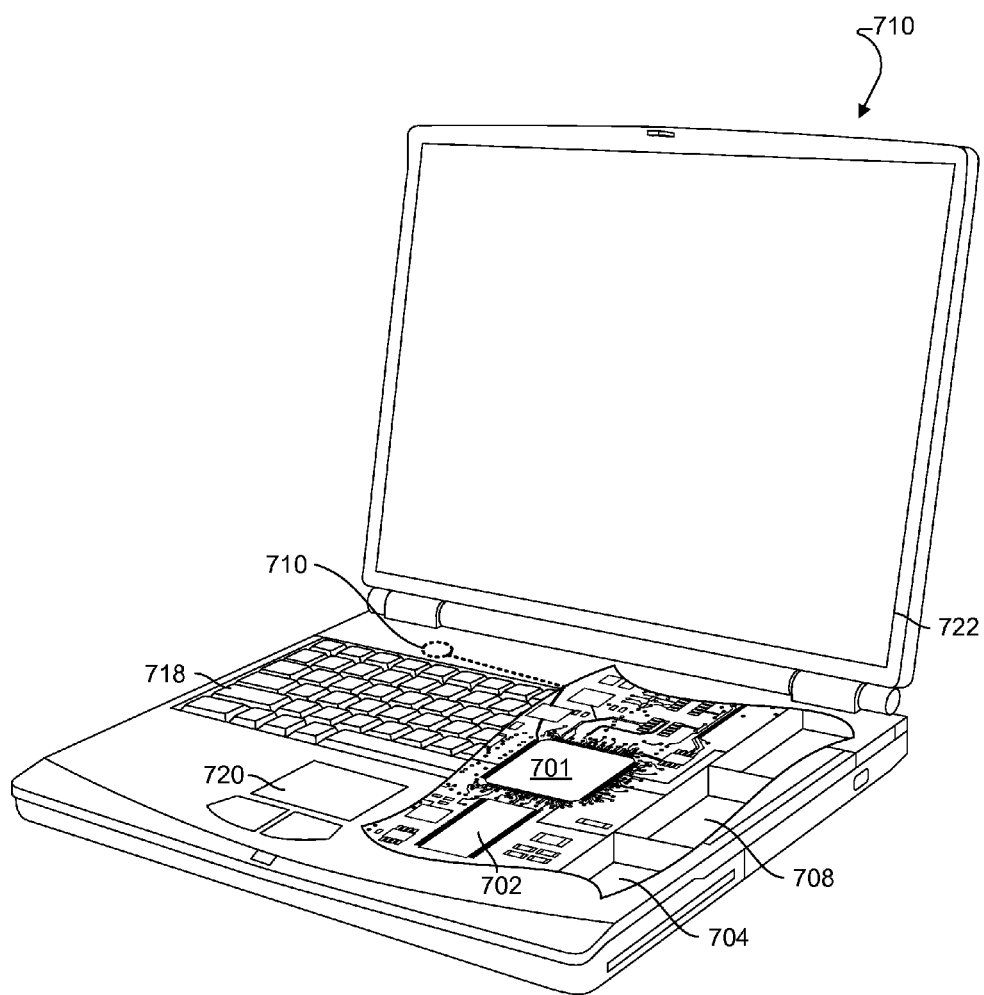
FIG. 7 is a component block diagram of an example laptop computer suitable for use with the various aspects.
Figure 8:
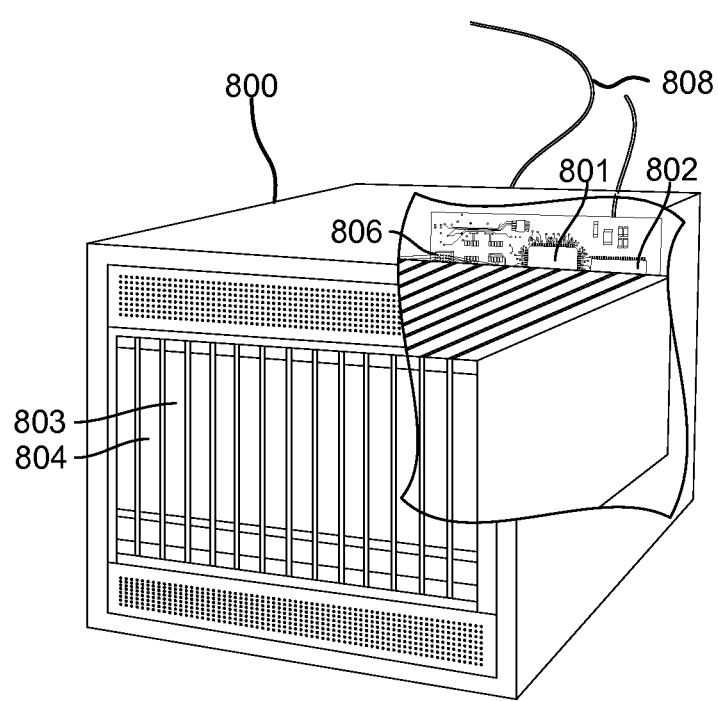
FIG. 8 is a component block diagram of an example server computer suitable for use with the various aspects.

The various aspects may be implemented on a variety of computing devices, examples of which are illustrated in FIGS. 6-8. FIG. 6 illustrates a mobile computing device in the form of a smartphone 600 that includes a multi-core processor 601 coupled to internal memory 602, a display 604 (e.g., touch screen display), and to a speaker 606. Additionally, the smartphone 600 may include an antenna 608 for sending and receiving electromagnetic radiation that may be connected to a wireless data link and/or a modem or cellular telephone transceiver 610 coupled to the multi-core processor 601. A smartphone 600 typically also includes menu selection buttons or rocker switches 612 for receiving user inputs.

The multi-core processor 601 may include circuits and structures similar to those described above and illustrated in FIG. 1, and include any or all of the logical or functional components illustrated in FIGS. 2 and 3. The modem 601 may also include multiple processing cores, and may be coupled to an antenna 608 for receiving and transmitting radio frequency signals.

A typical smartphone 600 also includes a sound encoding/decoding (CODEC) circuit 614, which digitizes sound received from a microphone into data packets suitable for wireless transmission and decodes received sound data packets to generate analog signals that are provided to the speaker to generate sound. Also, one or more of the multi-core processor 601, wireless transceiver 610 and CODEC 614 may include a digital signal processor (DSP) circuit (not shown separately).

Typical mobile computing devices will have in common the components illustrated in FIG. 7, which illustrates an example personal laptop computer 700. Such a personal computer 700 generally includes a multi-core processor 701 coupled to volatile memory 702 and a large capacity nonvolatile memory, such as a disk drive 704. The computer 700 may also include a compact disc (CD) and/or DVD drive 708 coupled to the processor 701. The computer device 700 may also include a number of connector ports coupled to the processor 701 for establishing data connections or receiving external memory devices, such as a network connection circuit for coupling the processor 701 to a network. The computing device 700 may have a radio/antenna 710 for sending and receiving electromagnetic radiation that is connected to a wireless data link coupled to the processor 701. The computer 700 may further include keyboard 718, a pointing a mouse pad 720, and a display 722 as is well known in the computer arts.

The various aspects may also be implemented on any of a variety of commercially available server devices, such as the server 800 illustrated in FIG. 8. Such a server 800 typically includes multiple processor systems one or more of which may be or include a multi-core processor 801. The processor 801 may be coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing data connections with a network 808, such as a local area network coupled to other broadcast system computers and servers.

The processors 601, 701, 801 may be any programmable multi-core multiprocessor, microcomputer or multiple processor chips that can be configured by software instructions (applications) to perform a variety of functions, including the functions and operations of the various aspects described herein. Multiple processors may be provided, such as one processor dedicated to wireless communication functions and one processor dedicated to running other applications. Typically, software applications may be stored in the internal memory 602, 702, 802 before they are accessed and loaded into the processor 601, 701, 801. In some mobile computing devices, additional memory chips (e.g., a Secure Data (SD) card) may be plugged into the mobile device and coupled to the processor 601, 701, 801. The internal memory 602, 702, 802 may be a volatile or nonvolatile memory, such as flash memory, or a mixture of both. For the purposes of this description, a general reference to memory refers to all memory accessible by the processor 601, 701, 801, including internal memory 602, 702, 802, removable memory plugged into the mobile device, and memory within the processor 601, 701, 801 itself.

Multiprocessor hardware designs, such as those discussed above with reference to FIG. 1, may include multiple processing cores of different capabilities inside the same package, often on the same piece of silicon. Symmetric multiprocessing hardware includes two or more identical processors that are connected to a single shared main memory and controlled by a single operating system. Asymmetric or "loosely-coupled" multiprocessing hardware may include two or more heterogeneous processors/cores that may each be controlled by an independent operating system and hardware description language or instruction set architecture, and connected to one or more shared memories/resources.

Computer program code or "code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space is not required be GPL licensed. It should be understood that the various software components/modules discussed here may be implemented in either the kernel space or the user space, unless expressly stated otherwise.

As used in this application, the terms "component," "module," "system," "service," "engine," "listener," "manager," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core, and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

A number of different types of memories and memory technologies are available or contemplated in the future, all of which are suitable for use with the various aspects. Such memory technologies/types include phase change memory (PRAM), dynamic random-access memory (DRAM), static random-access memory (SRAM), non-volatile random-access memory (NVRAM), pseudostatic random-access memory (PSRAM), double data rate synchronous dynamic random-access memory (DDR SDRAM), and other random-access memory (RAM) and read-only memory (ROM) technologies known in the art. A DDR SDRAM memory may be a double data rate (DDR) type 1 synchronous dynamic random access memory (SDRAM) memory, DDR type 2 SDRAM memory, DDR type 3 SDRAM memory, or a DDR type 4 SDRAM memory. Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language.

The foregoing method descriptions and the process flow diagrams are provided merely as illustrative examples and are not intended to require or imply that the blocks of the various aspects must be performed in the order presented. As will be appreciated by one of skill in the art the order of blocks in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of providing access to a shared memory region of a multiprocessor computing device having a first processing core and a second processing core, the method comprising:
    requesting, by a first process in the first processing core, address negotiation with a second process in the second processing core;
    obtaining a first address map of the first process in the first processing core in response to requesting address negotiation with the second process in the second processing core;
    sending the first address map to the second processing core so as to cause the second processing core to obtain a second address map of the second process in the second processing core;
    receiving a common virtual address in the first processing core in response to sending the first address map to the second processing core, the received common virtual address including an address included in both the first address map of the first process and the second address map of the second process;
    storing the received common virtual address as a first attribute of the shared memory region inside a first operating system kernel of the first processing core; and
    mapping the shared memory region at the received common virtual address of the first process.

2. The method of claim 1, further comprising:
    performing address matching operations in the second processing core to determine whether the first and second address maps include a matching virtual address;
    storing the matching virtual address as the common virtual address and as a second attribute of the shared memory region of a second operating system kernel of the second processing core;
    sending the common virtual address to the first processing core; and
    mapping physical pages of the shared memory region at the common virtual address for the second process in the second processing core.

3. The method of claim 2, wherein each of the first and second processing cores includes a hardware memory management unit (MMU).

4. The method of claim 2, wherein receiving the first address map in the second processing core comprises receiving the first address map in an address negotiation handler thread of the second processing core.

5. A multiprocessor computing device, comprising:
    means for requesting by a first process in a first processing core address negotiation with a second process in a second processing core;
    means for obtaining a first address map of the first process in the first processing core in response to requesting address negotiation with the second process in the second processing core;
    means for sending the first address map to the second processing core so as to cause the second processing core to obtain a second address map of the second process in the second processing core;
    means for receiving a common virtual address in the first processing core in response to sending the first address map to the second processing core, the received common virtual address including an address included in both the first address map of the first process and the second address map of the second process;
    means for storing the received common virtual address as a first attribute of a shared memory region inside a first operating system kernel of the first processing core; and
    means for mapping the shared memory region at the received common virtual address of the first process.

6. The multiprocessor computing device of claim 5, further comprising
    means for performing address matching operations in the second processing core to determine whether the first and second address maps include a matching virtual address;
    means for storing the matching virtual address as the common virtual address and as a second attribute of the shared memory region of a second operating system kernel of the second processing core;
    means for sending the common virtual address to the first processing core; and
    means for mapping physical pages of the shared memory region at the common virtual address for the second process in the second processing core.

7. The multiprocessor computing device of claim 6, wherein means for receiving the first address map in the second processing core comprises means for receiving the first address map in an address negotiation handler thread of the second processing core.

8. A multiprocessor computing device, comprising:
    a first processing core;
    a second processing core; and
    a shared memory region coupled to the first and second processing cores, wherein the first processing core is configured with processor-executable instructions to perform operations comprising:

requesting by a first process address negotiation with a second process in the second processing core;

obtaining a first address map of the first process in response to requesting address negotiation with the second process in the second processing core;

sending the first address map to the second processing core so as to cause the second processing core to obtain a second address map of the second process in the second processing core;

receiving a common virtual address in response to sending the first address map to the second processing core, the received common virtual address including an address included in both the first address map of the first process and the second address map of the second process;

storing the received common virtual address as a first attribute of the shared memory region inside a first operating system kernel; and mapping the shared memory region at the received common virtual address of the first process.

9. The multiprocessor computing device of claim 8, wherein the second processing core is configured with processor-executable instructions to perform operations comprising:

performing address matching operations to determine whether the first and second address maps include a matching virtual address;

storing the matching virtual address as the common virtual address and as a second attribute of the shared memory region of a second operating system kernel;

sending the common virtual address to the first processing core; and mapping physical pages of the shared memory region at the common virtual address for the second process.

10. The multiprocessor computing device of claim 9, wherein each of the first and second processing cores includes a hardware memory management unit (MMU).

11. The multiprocessor computing device of claim 9, wherein the second processing core is configured with processor-executable instructions to perform operations such that receiving the first address map comprises receiving the first address map in an address negotiation handler thread.

12. A non-transitory computer readable storage medium having stored thereon processor-executable software instructions configured to cause a first processing core of a multiprocessor computing device to perform operations comprising:

requesting by a first process address negotiation with a second process in a second processing core of the multiprocessor computing device;

obtaining a first address map of the first process in response to requesting address negotiation with the second process in the second processing core;

sending the first address map to the second processing core so as to cause the second processing core to obtain a second address map of the second process in the second processing core;

receiving a common virtual address in response to sending the first address map to the second processing core, the received common virtual address including an address included in both the first address map of the first process and the second address map of the second process;

storing the received common virtual address as a first attribute of a shared memory region inside a first operating system kernel; and mapping the shared memory region at the received common virtual address of the first process.

13. The non-transitory computer readable storage medium of claim 12, wherein the stored processor-executable software instructions are configured to cause the second processing core of the multiprocessor computing device to perform operations comprising:

performing address matching operations to determine whether the first and second address maps include a matching virtual address;

storing the matching virtual address as the common virtual address and as a second attribute of the shared memory region of a second operating system kernel;

sending the common virtual address to the first processing core; and mapping physical pages of the shared memory region at the common virtual address for the second process.

14. The non-transitory computer readable storage medium of claim 13, wherein the stored processor-executable software instructions are configured to cause the second processing core of the multiprocessor computing device to perform operations such that receiving the first address map comprises receiving the first address map in an address negotiation handler thread.

* * * * *